(12) United States Patent
Ajanovic et al.

(10) Patent No.: US 6,253,270 B1
(45) Date of Patent: Jun. 26, 2001

(54) METHOD AND APPARATUS FOR ARBITRATING OWNERSHIP OF AN INTERFACE BETWEEN HUB AGENTS

(75) Inventors: Jasmin Ajanovic, Folsom; David J. Harriman, Sacramento, both of CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/223,045

(22) Filed: Dec. 30, 1998

(51) Int. Cl.[7] ................................................. G06F 13/36
(52) U.S. Cl. .......................... 710/107; 710/113; 710/240; 370/462
(58) Field of Search ..................................... 710/107, 113, 710/241, 243, 240, 114, 100; 340/825.5; 370/462

(56) References Cited

U.S. PATENT DOCUMENTS 5,313,591 * 5/1994 Averill .
5,901,294 * 5/1999 Tran et al. .
6,003,102 * 12/1999 Aybay et al. .

* cited by examiner

Primary Examiner—Gopal C. Ray
(74) Attorney, Agent, or Firm—Calvin Wells

(57) ABSTRACT

An apparatus for arbitrating ownership of an interface between two hub agents is described. The apparatus includes a data path input/output unit to communicate with a data path and an arbitration circuit. The arbitration unit includes a least recently serviced status tracking circuit to determine which of the data path input/output unit and a device that transmits the second request signal has been granted ownership of the data path least recently, an arbitration signal output circuit to output a first request signal, and an arbitration signal input circuit to receive a second request signal. The arbitration unit grants ownership of the data path to the data path input/output unit when the first request signal is asserted if the second request signal is not asserted.

13 Claims, 9 Drawing Sheets

METHOD AND APPARATUS FOR ARBITRATING OWNERSHIP OF AN INTERFACE BETWEEN HUB AGENTS

FIELD OF THE INVENTION

The present invention pertains to the field of computer systems. More particularly, this invention pertains to the field of arbitrating ownership of an interface between devices in a computer system.

BACKGROUND OF THE INVENTION

Prior computer systems typically rely on standardized busses, such as the Peripheral Component Interconnect (PCI) bus, to allow computer system chipset components to communicate one with another. For example, a transaction originating at a processor and intended for a disk drive might first be delivered to a first chipset component that serves as an intermediary between the processor bus and a PCI bus. The first chipset component would then deliver the transaction over the PCI bus to a second system chipset component which would then deliver the transaction to the disk drive.

Busses such as the PCI bus also provide for communication with other computer system devices such as graphics controllers and network adapters. Because busses such as the PCI bus must interface with a variety of component types, each with varying requirements, they are not necessarily optimized for allowing communication between chipset components. Further, chipset manufacturers who rely on standardized busses such as the PCI bus must adhere to bus standards in order to ensure compatibility with other components, and are not at liberty to make substantial changes in how the chipset components communicate with each other. Another issue that faces chipset component manufacturers in designing and manufacturing chipset components is the need to conform to standardized supply and signaling voltages when relying on busses such as PCI for communication between chipset components, thereby locking the manufacturers into certain design practices and manufacturing technologies.

Prior computer systems that rely on standardized busses such as PCI for communication between chipset components also typically have a centralized arbitration scheme that may not provide optimized performance for transactions between two particular components, since the centralized arbiter must be able to handle transaction requests from a number of components. Further, standardized busses such as PCI require separate signals for arbitration and data transfer framing.

SUMMARY OF THE INVENTION

A method and apparatus for arbitrating ownership of an interface between hub agents in a computer system is disclosed. The apparatus includes a data path input/output unit to communicate with a data path and an arbitration circuit. The arbitration unit includes a least recently serviced status tracking circuit, an arbitration signal output circuit to output a first request signal, and an arbitration signal input circuit to receive a second request signal. The arbitration unit grants ownership of the data path to the data path input/output unit when the first request signal is asserted if the second request signal is not asserted.

Other features and advantages of the present invention will be apparent from the accompanying drawings and from the detailed description that follows below.

BRIEF DESCRIPTION OF THE DRAWINGS

The invention is illustrated by way of example and not limitation in the figures of the accompanying drawings, in which like references indicate similar elements, and in which.

DETAILED DESCRIPTION

One embodiment of an apparatus for arbitrating ownership of an interface between two hub agents is disclosed. The apparatus includes a data path input/output unit to communicate with a data path and an arbitration circuit. The arbitration unit includes a least recently serviced status tracking circuit, an arbitration signal output circuit to output a first request signal, and an arbitration signal input circuit to receive a second request signal. The arbitration unit grants ownership of the data path to the data path input/output unit when the first request signal is asserted if the second request signal is not asserted. An intended advantage of the embodiment is to provide an efficient means of arbitrating ownership of a hub interface between two hub agents. An additional intended advantage of the embodiment is to provide a cost reduction through reducing the number of signals required to arbitrate for ownership of the hub interface and to frame data transfers on the hub interface.

Figure 1:
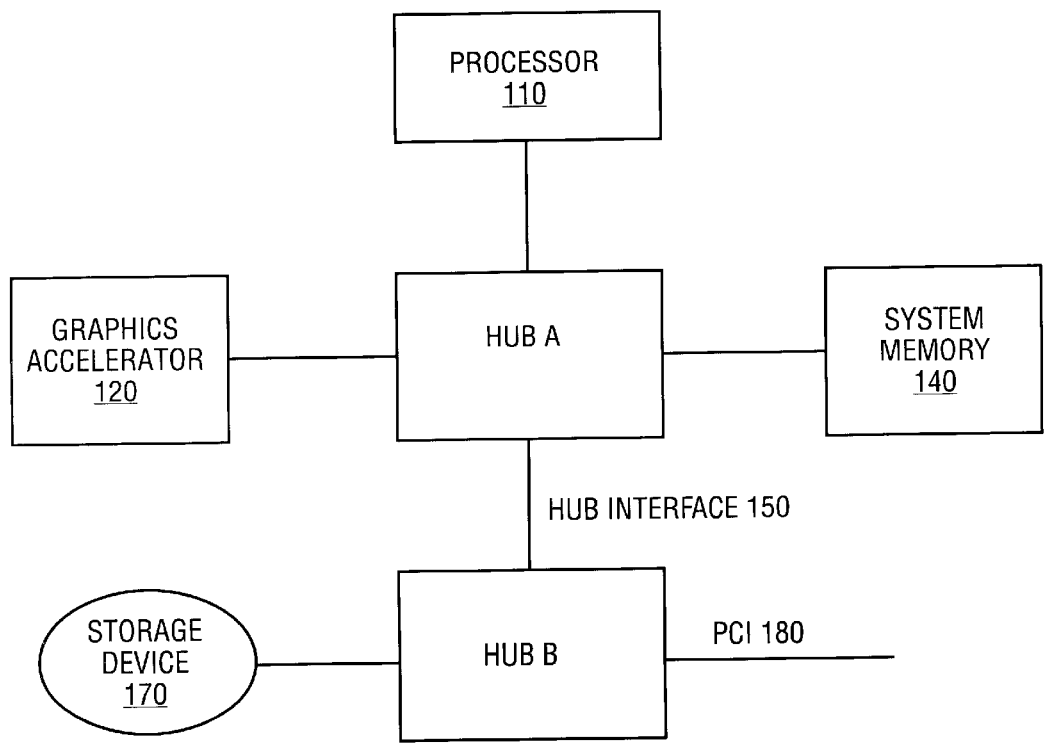
FIG. 1 shows one embodiment of a computer system including a hub interface.

FIG. 1 shows one embodiment of a computer system 100 including a hub interface 150. The system 100 includes a processor 110 coupled to a hub A. The hub A may include a memory controller, and is coupled to a system memory 140. The hub A is also coupled to a graphics accelerator 120. The graphics controller 120 is preferably coupled to the hub A via an accelerated graphics port (AGP). The hub A is coupled to a hub B via the hub interface 150 (hubs A and B may also be referred to as hub agents). The hub B preferably provides an interface to a storage device 170. The storage device 170 is preferably a hard disk drive. The hub B also preferably provides an interface to a PCI bus 180. The hub B may also include interfaces to other system components.

Figure 2:
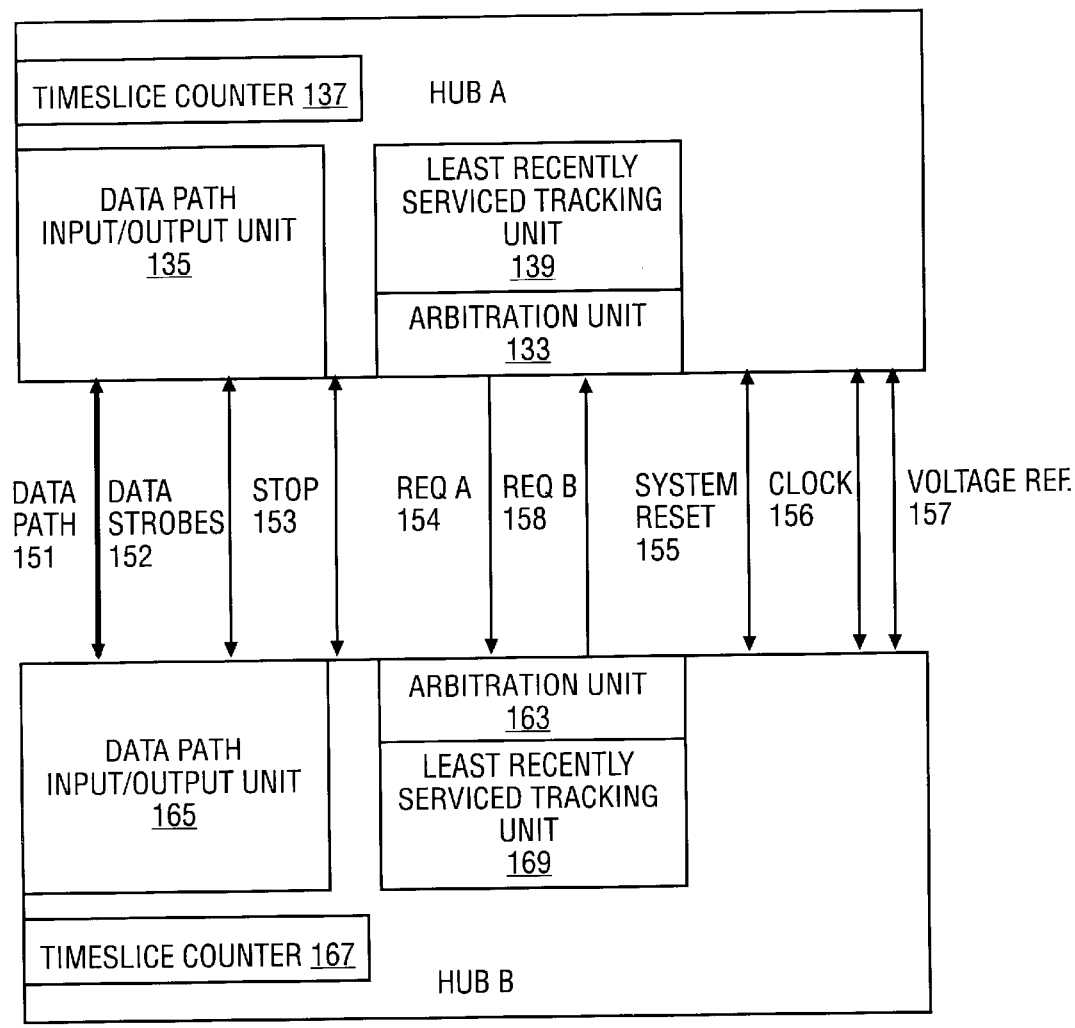
FIG. 2 is a block diagram of one embodiment of two hub agents connected by a hub interface including a data path and request signals.

FIG. 2 is a block diagram of one embodiment of the hub interface 150 coupling the hub A and the hub B. The hub interface 150 includes a bidirectional data path 151, a clock signal 156, one or more data strobes 152 that preferably operate at four times the frequency of the clock signal 156, a stop signal 153, a request A signal 154 (Req A) and a request B signal 158 (Req B), a system reset signal 155, and a voltage reference signal 157. The data strobes 152 may operate at a multiple of the clock signal 156 other than four. For example, the data strobes 152 may run at a rate of eight times that of the clock signal 156. The data path is preferably 8 bits wide, although the data path width may be any width that is a power of 2 and greater than or equal to 8 bits. Hub A includes a data path input/output unit 135 and hub B includes a data path input/output unit 165. Both data path input/output units 135 and 165 interface to the data path 151.

Hub A and hub B also each include an arbitration unit (arbitration units 133 and 163), a least recently serviced tracking unit (least recently serviced tracking units 139 and 169), and a timeslice counter (timeslice counters 137 and 167).

In general, the hub link 150 is a mechanism for connecting main building blocks of the core logic of a computer system, such as the system 100, via a relatively narrow (8 bits in the present embodiment) and relatively high bandwidth data path 151. Between individual components in a computer system, such as between hub A and hub B, the connection is implemented in a point-to-point fashion. Transfers of information across the hub link 150 are preferably accomplished using a packet based protocol.

Arbitration for ownership of the hub interface 150 is accomplished by both the arbitration unit 133 and the arbitration unit 163. The assertion of either the req A signal 154 or the req B signal 158 is an arbitration event. At each arbitration event, both the arbitration unit 133 and the arbitration unit 163 examine both the req A signal 154 and the req B signal 158 and determine ownership of the hub interface 150 independently and simultaneously. When the hub interface 150 is idle, the first of either hub A or hub B to assert its request signal (req A 154 and req B 158, respectively) wins ownership. If the hub A and hub B request ownership simultaneously when the interface 150 is idle, then the least recently serviced hub agent wins ownership. Both the hub A and the hub B must track least recently serviced status via the least recently serviced tracking units 133 and 163. Each hub agent is always either the least recently serviced agent or the most recently serviced agent, and each agent always has the opposite least recently serviced status from the other agent.

Once a hub agent acquires ownership of the hub interface 150, it will continue to own the interface 150 as long as its request signal is sampled asserted. The timeslice counters 137 and 167 included in hub A and hub B, respectively, are used to control bandwidth allocation and to limit a hub agent's hub interface ownership tenure. The timeslice values may be different for hub agent A and hub agent B, or the timeslice values may be identical. The timeslice counters 137 and 167 are started when their hub agent acquires ownership of the hub interface 150. For example, the timeslice counter 137 is started when hub agent A acquires ownership of the hub interface 150. The timeslice counters preferably count periods of the clock signal 156. Upon counter expiration, the other hub agent's request signal is sampled by the current hub interface owner which then removes its request signal at an appropriate boundary in a data transfer if the other hub agent's request is sampled active. When a hub agent removes its request due to timeslice expiration, it preferably will not reassert the request signal until the other hub agent has won ownership of the hub interface. The hub agents A and B should correctly implement the timeslice function because each hub agent is responsible for managing its own timeslice allocation. In order to ensure proper system performance, each hub agent should have its timeslice value programmed appropriately. Timeslice values are preferably programmed under software control.

Also in order to ensure proper system operation, speculative requests should preferably not be allowed. For example, if the hub agent A asserts its req A signal and then determines that it has no data to transfer, the hub agent A should wait until it has acquired ownership of the hub interface 150 and transmit at least one NOP special cycle request packet before removing the req A signal.

For the example timing diagrams discussed below in connection with FIGS. 3 through 7, the data strobes 152 clock data out of and into the data path input/output units 135 and 165 at a rate of four times that of the clock signal 156. The width of the data path 151 for these examples is 8 bits. The numbered clock edges discussed in connection with FIGS. 3 through 7 refer to edges of the clock signal 156.

Figure 3:
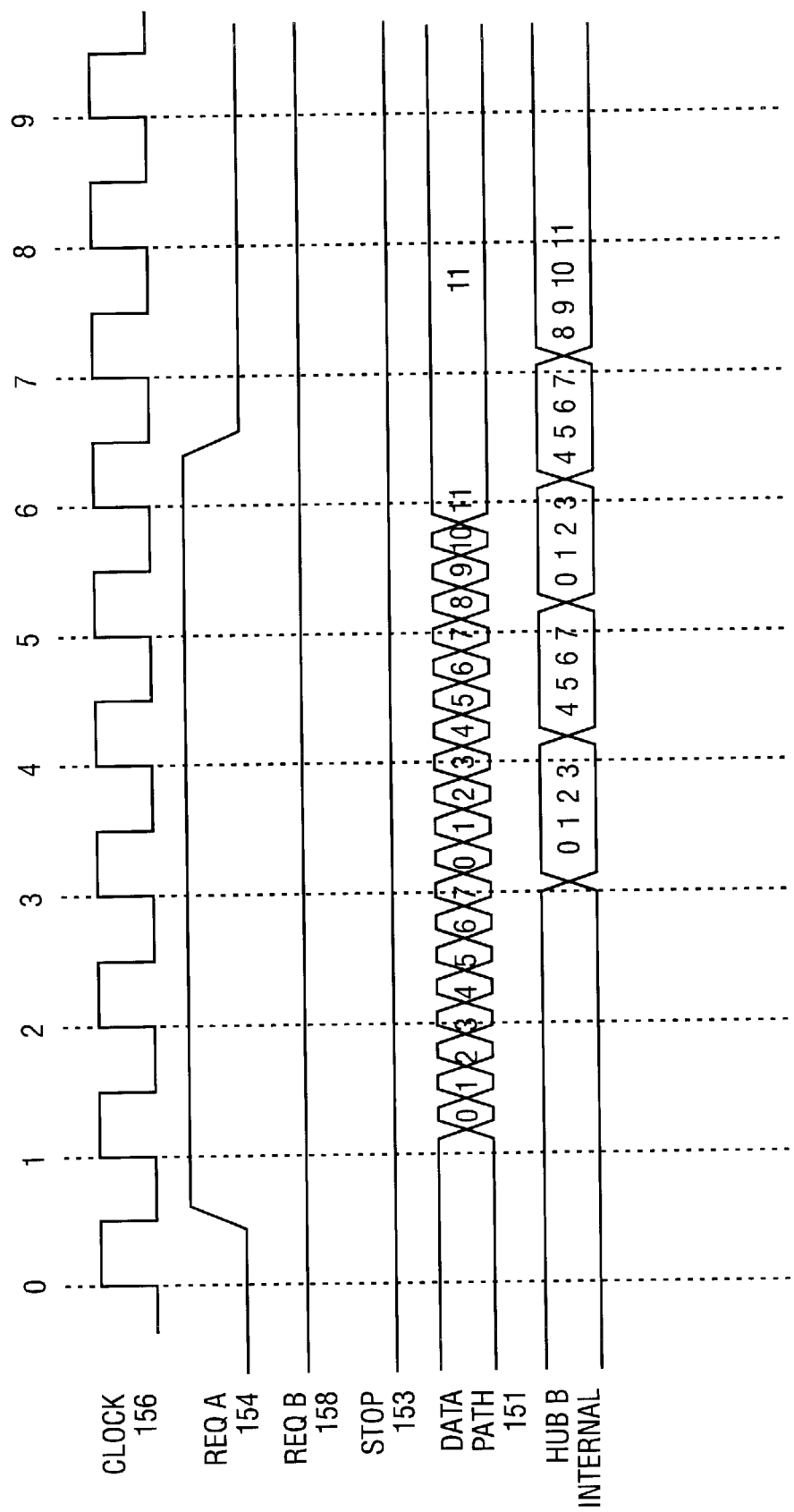
FIG. 3 is a timing diagram of one embodiment of a data transfer involving basic arbitration and framing for two packets where hub agent A is the most recently serviced hub agent.

FIG. 3 is a timing diagram of one embodiment of a data transfer involving basic arbitration and framing for two packets where hub agent A is the most recently serviced hub agent. For this example, hub agent A is transferring data to hub agent B across the hub interface 150. The data to be transferred consists of two packets. The first packet is two double words long and the second packet is three double words long. At rising clock edge 0, the hub interface 150 is idle. Because hub agent A is the most recently serviced hub agent, it is not assured of winning arbitration. Therefore, it asserts the req A signal 154 and samples the state of the req B signal 158 as inactive on clock edge 1 before beginning a transfer of data off of the same clock edge. Hub agent B understands that agent A is the most recently serviced agent, and therefore understands the timing relationship between when the req A signal 154 is first sampled asserted at clock edge 1 and when data is available for latching at clock edge 3. Although specific timing relationships between events are mentioned for this example and for other examples that follow, other embodiments that use different timing relationships are possible. For example, it is possible for a three clock period to exist between the beginning of data transmission and latching the data in the receiving device, rather than the two clock period mentioned above.

The first doubleword (32 bits) of data begins to arrive at hub agent B before clock edge 3, and is buffered within hub agent B until hub agent B latches the first doubleword of transferred data at clock edge 3. Hub agent B continues to sample the req A signal 154 and continues to latch data off of the clock edges that follow one clock period after the req A signal 154 is sampled asserted. For example, the req A signal 154 is sampled asserted at clock edge 3. The hub agent A began transferring the second double word of data (this data is associated with the clock edge 3 assertion of the req A signal 154) at clock edge 2 and the hub agent B latches the second doubleword of data at clock edge 4. This timing relationship continues until the deassertion of the req A signal 154 after clock edge 6 and the latching of the last double word of data at clock edge 7.

Figure 4:
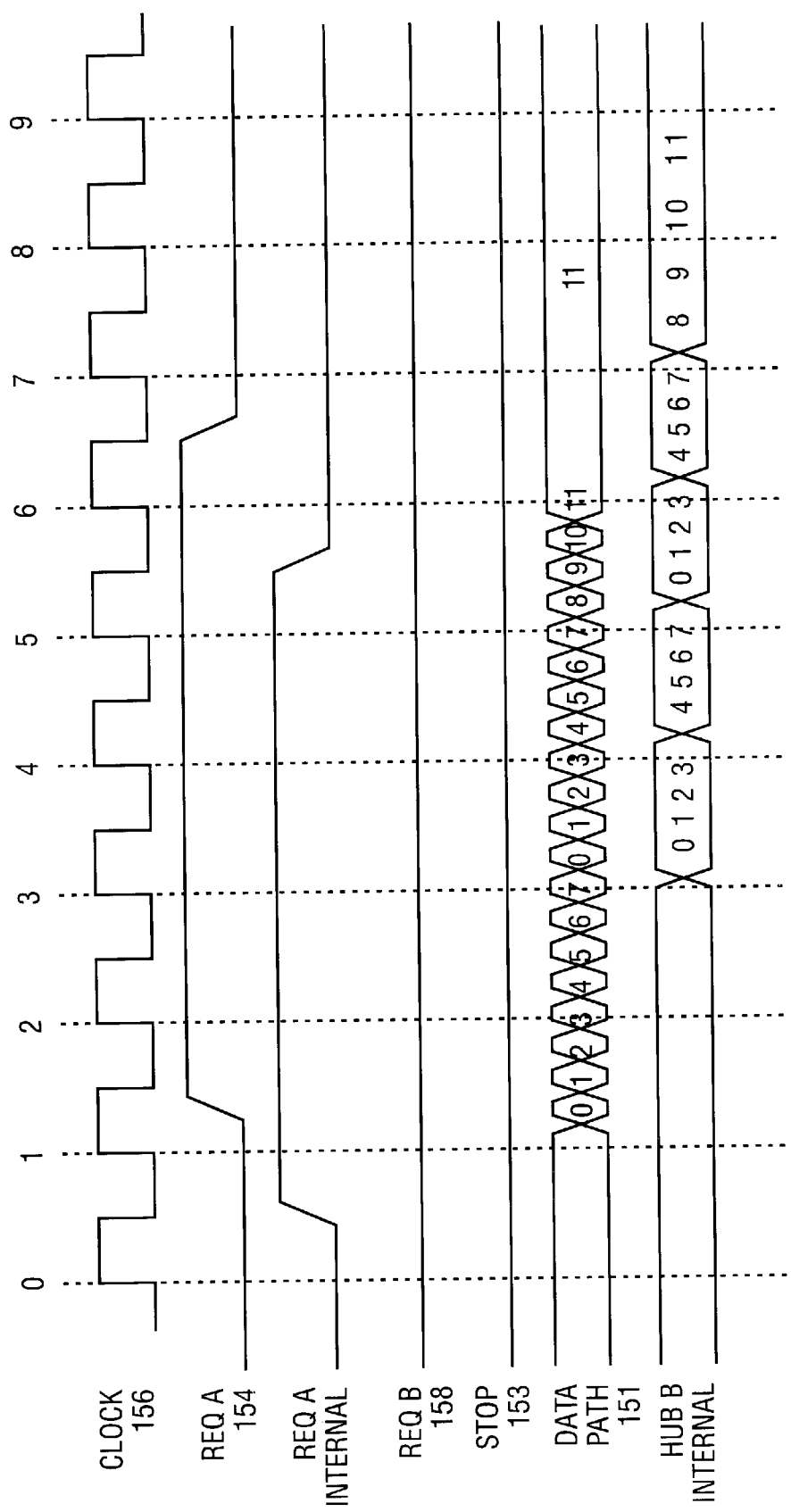
FIG. 4 is a timing diagram of one embodiment of a data transfer involving basic arbitration and framing for two packets where hub agent A is the least recently serviced hub agent.

FIG. 4 is a timing diagram of one embodiment of a data transfer involving basic arbitration and framing for two packets where hub agent A is the least recently serviced hub agent. The timing relationships for this example are very similar to those discussed above in connection with FIG. 3. However, for this example, the hub agent A is the least recently serviced agent. Therefore, the hub agent A is assured of winning arbitration even if the hub agent B asserts its req B signal 158 simultaneously with the req A signal 154. This allows the hub agent A to begin driving data onto the data path 151 off of the clock edge 1 preceding the clock edge 2 where the req A signal 154 is sampled asserted. The first doubleword of data is latched internally to the hub agent B off of clock edge 3.

Figure 5:
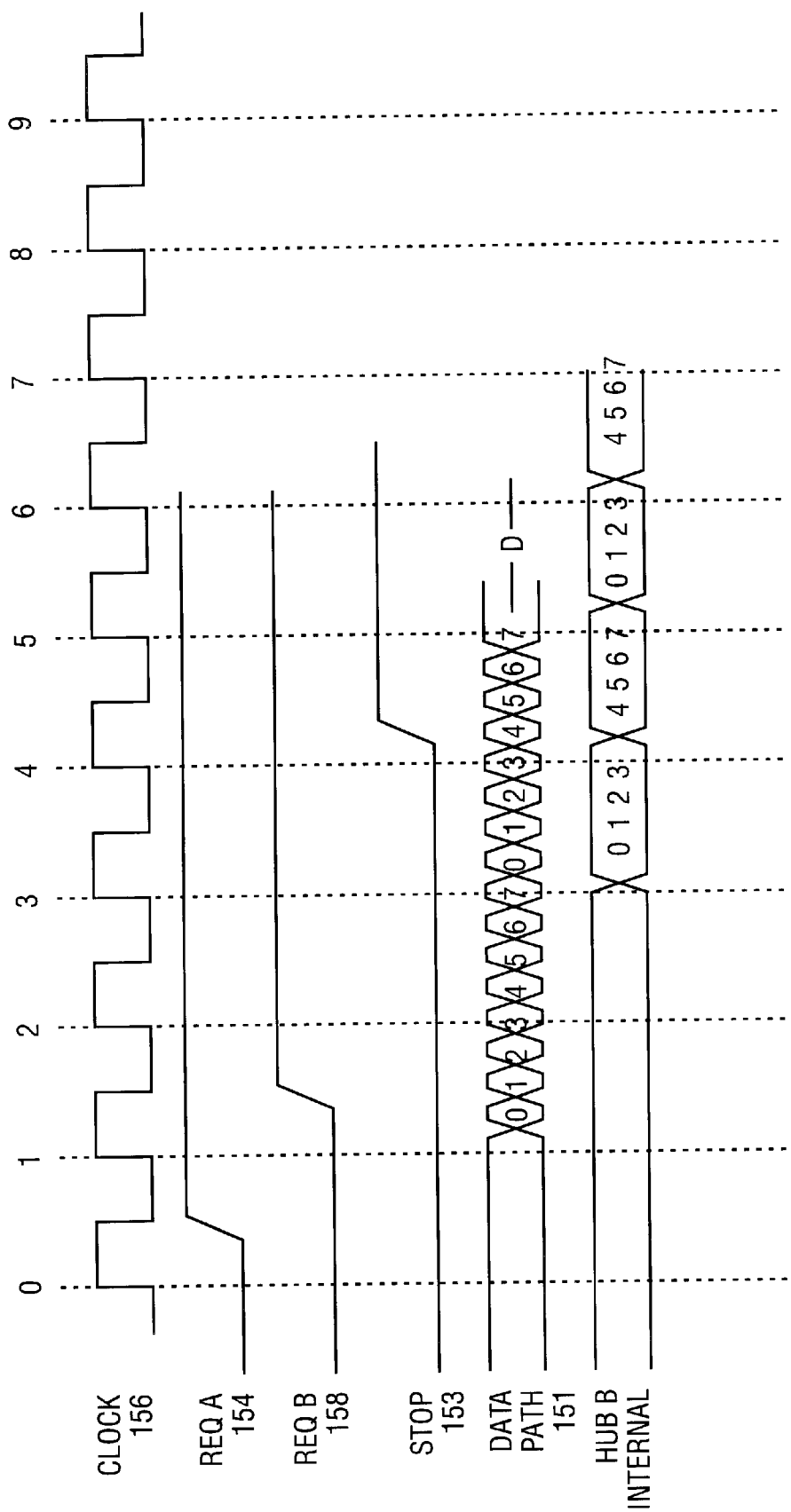
FIG. 5 is a timing diagram of one embodiment of a data transfer where hub agent A is the most recently serviced hub agent and agent B asserts the Stop signal to reject the first doubleword of the transfer.

FIG. 5 is a timing diagram of one embodiment of a data transfer where hub agent A is the most recently serviced hub agent and hub agent B asserts the stop signal 153 to reject the first doubleword of the transfer. In general, a data transfer may be retried or disconnected by the receiving hub agent due to lack of queue space, data buffer space, or for other reasons. This flow control is accomplished via the stop signal 153. For the case, as in the present example, where the data strobes 152 run at a rate of four times that of the clock signal 156, the stop signal is sampled on edges of the clock signal 156. Ownership of the stop signal 153 belongs to the receiving hub agent. The timing diagram of FIG. 5 shows an example of stop signal operation. The hub agent A gains ownership of the data path 151 according to the protocols described above in connection with FIGS. 3 and 4. The hub agent A begins driving data onto the data path off of clock edge 1. The hub agent B latches the first doubleword of data off of clock edge 3. For whatever reason, the hub agent B desires to reject the first doubleword of data, and off of clock edge 4 asserts the stop signal 153. The hub agent A samples the stop signal 153 at clock edge 5 and ceases transmission. For present case where two clock periods are allowed for data propagation (the period between the transmitting hub agent driving data onto the interface and the receiving hub agent internally latching data), the transmitting hub agent (hub A in this example) will sample the stop signal four clock periods following the beginning of transmission. Where three clock periods are allowed for data propagation, the transmitting hug agent samples the stop signal five clock periods following the beginning of transmission.

Following the sampling of an asserted stop signal, the transmitting hub agent should determine if the other hub agent is requesting ownership of the interface. If not, the current owner may attempt to transmit any data packet following recovery from the assertion of the stop signal. If the other hub agent is requesting ownership, the current owner must release the interface if its timeslice has expired. If its timeslice has not expired, it may continue to transmit packets only if it can transmit a packet of a different type from any packets that have been retried during the current owner's current ownership tenure. Following the transmission of one such packet, the owner may re-attempt to retransmit a packet of the same type that has already been retried in the current session if there is reason to believe that the transmission will succeed. In any case where the current owner is stopped and the other hub agent is requesting ownership of the interface, the current owner may simply release the interface to the other agent.

Returning to the timing diagram of FIG. 5, the first doubleword for the first packet (two packets are being transmitted) is transmitted off of clock edge 1 and is latched at the receiving hub agent (hub agent B) off of clock edge 3. The hub agent B drives stop signal 153 off of clock edge 4. The hub agent A samples the stop signal 153 asserted at clock edge 5. The observation of the stop signal 153 indicates that the first packet is retried by the hub agent B. The two doublewords transmitted for the first packet are discarded in the hub agent B.

Figure 6:
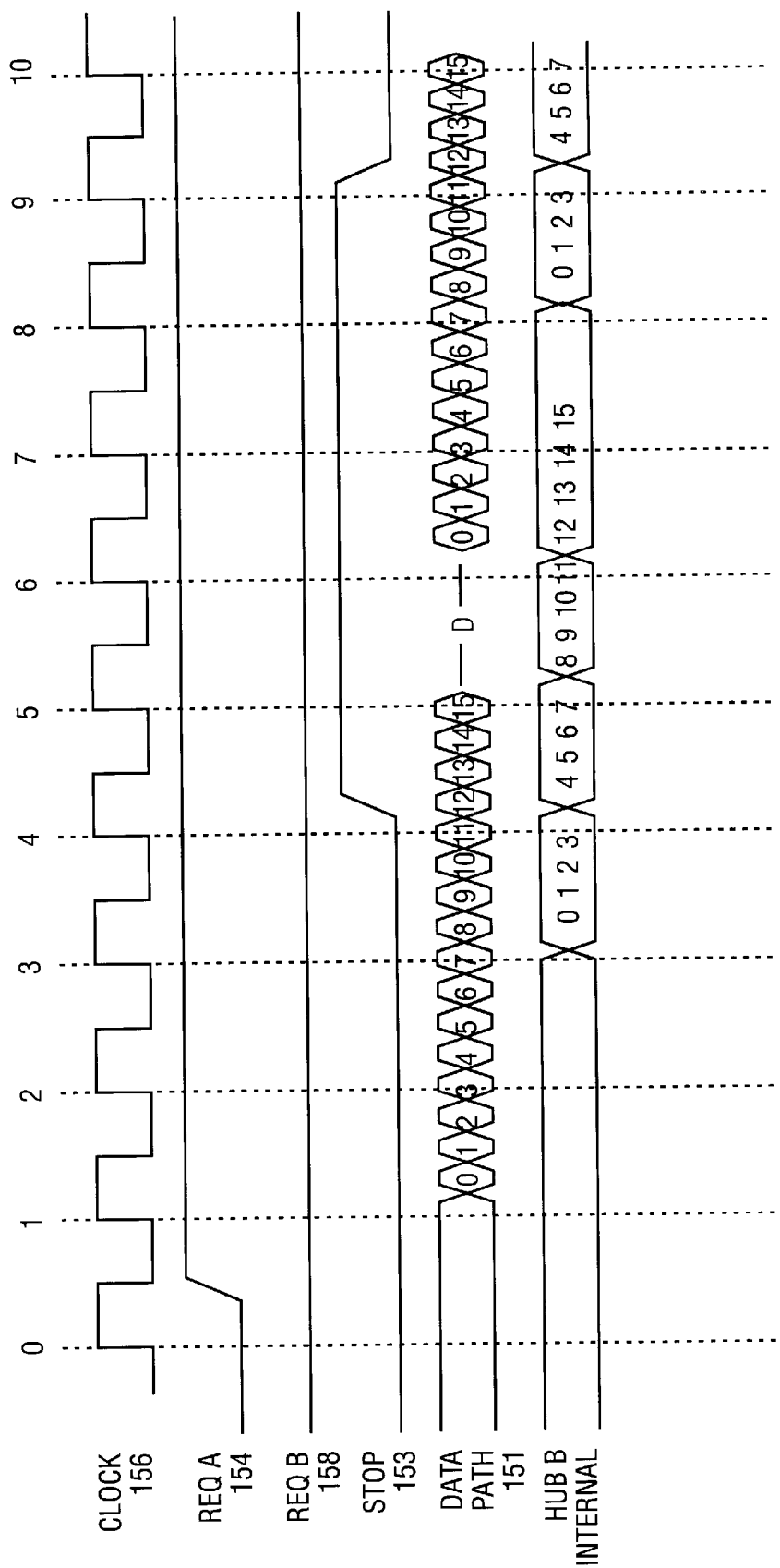
FIG. 6 is a timing diagram of one embodiment of a data transfer where hub agent A is the most recently serviced hub agent and agent B asserts the Stop signal to reject the first doubleword of a long transfer and hub agent A retries the transfer.

FIG. 6 is a timing diagram of one embodiment of a data transfer where the hub agent A is the most recently serviced hub agent and the hub agent B asserts the stop signal 153 to reject the first doubleword of a long transfer and hub agent A retries the transfer. The hub agent A acquires ownership of the data path 151 according to the protocols previously discussed. The hub agent A then begins transmitting off of clock edge 1. The first doubleword of data is received internally within the hub agent B off of clock edge 3, and off of clock edge 4 the hub agent B asserts the stop signal 153 in order to reject the first doubleword of data. The hub agent B continues to assert the stop signal 153 for clock edges 6, 7, and 8 in order to reject the second, third, and fourth doublewords of the transfer. The stop signal 153 is not sampled at clock edge 9, although it remains asserted.

The first clock edge where the stop signal 153 is sampled is referred to as the "initial stop" and subsequent clock edges where the stop signal 153 is sampled asserted due to the pipelining of packet transmissions are referred to as "forced stops". For the example of FIG. 6, the assertion of the stop signal 153 at clock edge 5 is an initial stop and the assertion of the stop signal 153 at clock edges 6, 7, and 8 are forced stops.

The example timing diagram of FIG. 6 shows the case where the hub agent that transmitted the stopped packet (hub agent A) is still transmitting information for the same packet as the one to which the initial assertion of the stop signal 153 applies. For this case, all information transmitted from the assertion of the stop signal 153 to the end of the same packet are discarded by the receiving hub agent (hub agent B). If the transmitting hub agent (hub agent A) is in the middle of packet transmission, the transmission is interrupted off of the clock edge where the stop signal 153 is first sampled asserted. After one dead clock following the sampling of the asserted stop signal 153, the transmitting hub agent (hub agent A) may continue to transmit if its timeslice has not expired and it has a different packet to transmit, or if the other hub agent (hub agent B) is not requesting the interface. For the example timing diagram of FIG. 6, the initial stop is sampled at clock edge 5 and hub agent A ceases transmission off of this clock edge. A dead clock period follows. Because the req B signal 158 is not asserted, the hub agent A may recommence transmission at clock edge 6.

Figure 7:
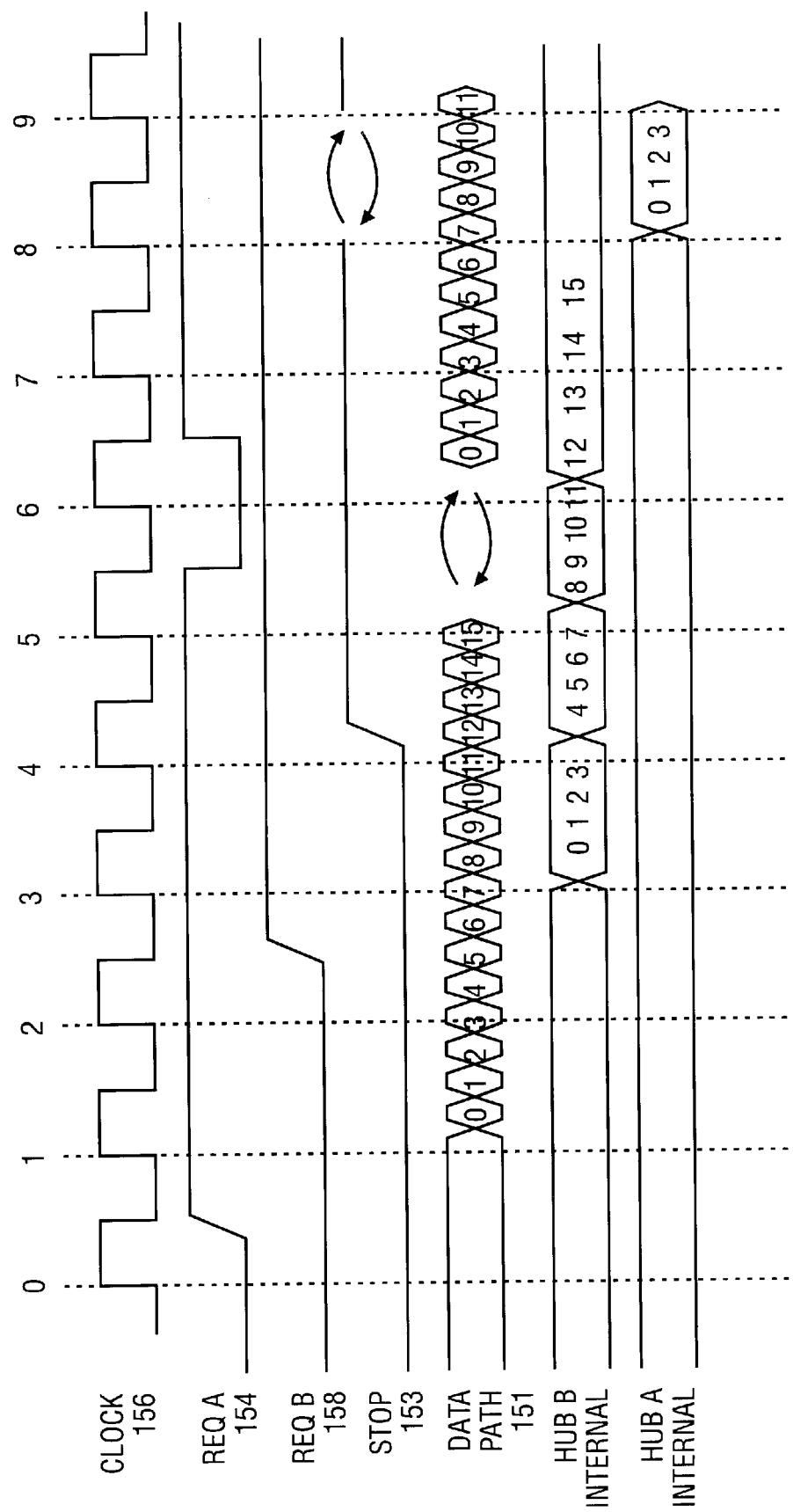
FIG. 7 is a timing diagram of one embodiment of a data transfer where hub agent A is the most recently serviced hub agent and agent B asserts the Stop signal to reject the first doubleword of a long transfer and hub agent A releases the interface to hub agent B.

FIG. 7 is a timing diagram of one embodiment of a data transfer where hub agent A is the most recently serviced hub agent and agent B asserts the Stop signal to reject the first doubleword of a long transfer and hub agent A releases the interface to hub agent B. The example timing diagram of FIG. 7 is another example of the case where the hub agent that transmitted the stopped packet (hub agent A) is still transmitting information for the same packet as the one to which the initial assertion of the stop signal 153 applies. In this example, when the initial assertion of the stop signal 153 is sampled at clock edge 5, the req B signal 158 is asserted. The hub agent A ceases transmission off of this clock edge and also deasserts the req A signal, allowing the hub agent B to gain ownership of the interface. The hub agent B begins transmitting off of the clock edge 6, and the first doubleword of data transmitted by hub agent B is latched internally by hub agent A off of clock edge 8. The hub agent B gives up ownership of the stop signal 153 at clock edge 8, and ownership of the stop signal 153 is assumed by hub agent A at clock edge 9.

Another case exists where the hub agent that transmitted the stopped packet is still transmitting information, but for a different packet from the one to which the initial assertion of the stop signal applies. For this case, all succeeding packets must also be stopped by the receiving hub agent, although other embodiments may allow transmission to continue. If the succeeding packet is in the middle of transmission, the transmission is interrupted off of the edge where the initial stop is observed. If the transmitting hub agent is capable of doing so and if its timeslice has not expired, it may attempt to retransmit any of the succeeding packets (but not the initial one) for the case where the other hub agent has asserted its request signal. Preferably, this will only be done if the packet is of a different type from that of the rejected packet.

When a hub agent's transmission is rejected, the hub agent is required in some circumstances to deassert its request signal and give the interface to the other agent. In other cases, a hub agent may not be able to recover immediately from having a transmission rejected. Because it is preferable that a hub agent not be allowed to assert its request signal without making a transmission on the interface, if the dead clock caused by the assertion of the stop signal falls on the clock where transmission would otherwise have begun, the agent must either recover and transmit some regular packet or must transmit a NOP packet and may then release its request signal. In the case where the agent would normally have to release the interface because of timeslice expiration, the agent is allowed to retransmit the original packet or any other packet if it won ownership of the interface by an arbitration event occurring in the window between the transmission of the initial packet and the assertion of the stop signal for that packet. If the hub agent has already transmitted some part of a packet before the assertion of the stop signal is observed, it may either keep the interface ownership or release it to the other hub agent.

Figure 8:
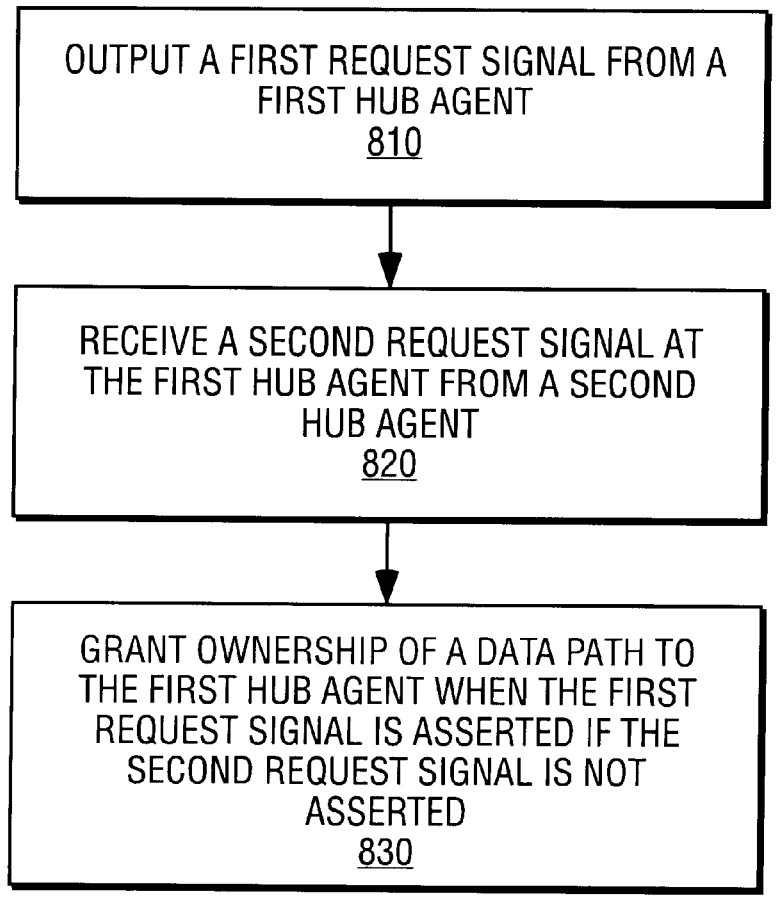
FIG. 8 is a flow chart of one embodiment of a method for arbitrating ownership of an interface between hub agents.

FIG. 8 is a flow chart of one embodiment of a method for arbitrating ownership of an interface between hub agents. At step 810, a first request signal is output from a first hub agent. A second request signal from a second hub agent is received at the first hub agent at step 820. At step 830, ownership of a data path is granted to the first hub agent when the first request signal is asserted if the second request signal is not asserted.

Figure 9:
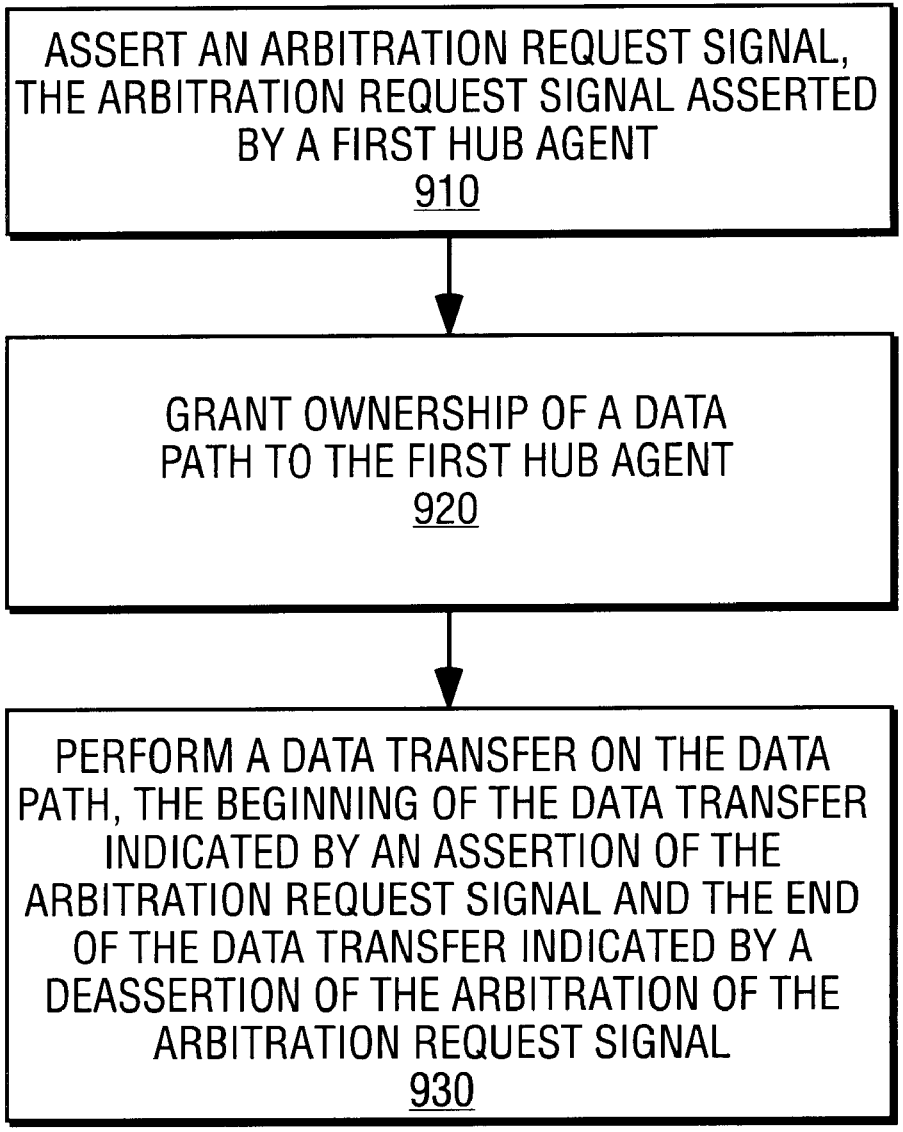
FIG. 9 is a flow chart of one embodiment of a method for reusing an arbitration signal to frame a data transfer between two hub agents.

FIG. 9 is a flow chart of one embodiment of a method for reusing an arbitration signal to frame a data transfer between two hub agents. At step 910, an arbitration request signal is asserted by a first hub agent. Ownership of a data path is granted to the first hub agent at step 920. At step 930, a data transfer is performed on the data path where the beginning of the data transfer is indicated by the asserted of the arbitration request signal and the end of the data transfer is indicated by the deassertion of the arbitration request signal.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An apparatus, comprising:
    a data path input/output unit to communicate with a data path; and
    an arbitration unit including an arbitration signal output circuit to output a first request signal, an arbitration signal input circuit to receive a second request signal, the arbitration unit to grant ownership of the data path to the data path input/output unit when the first request signal is asserted if the second request signal is not asserted, and a least recently serviced status tracking circuit to determine which of the data path input/output unit and a device that transmits the second request signal has been granted ownership of the data path least recently.

2. The apparatus of claim 1, wherein if the least recently serviced status tracking unit determines that the device that transmits the second request signal has been granted ownership of the data path least recently the arbitration unit asserts the first request signal and determines that the second request signal is not asserted before granting ownership of the data path to the data path input/output unit.

3. The apparatus of claim 1, wherein if the least recently serviced status tracking unit determines that the device that transmits the second request signal has been granted ownership of the data path least recently and the first and second request signals are asserted, the arbitration unit does not grant ownership of the data path to the data path input/output unit.

4. The apparatus of claim 1 wherein the least recently serviced status tracking unit comprehends that the device that transmits the second request signal has been granted ownership of the data path.

5. A system, comprising:
    a first hub agent coupled to a data path, the first hub agent including
        a first data path input/output unit to communicate with the data path, and
        a first arbitration circuit including a first least recently serviced status tracking circuit, a first arbitration signal output circuit to output a first request signal, and a first arbitration signal input circuit to receive a second request signal, the first arbitration unit to grant ownership of the data path to the first hub agent circuit when the first request signal is asserted if the second request signal is not asserted; and
    a second hub agent coupled to the data path, the second hub agent including
        a second data path input/output unit circuit to communicate with the data path, and
        a second arbitration circuit including a second least recently serviced status tracking circuit, a second arbitration signal output circuit to output the second request signal, and a second arbitration signal input circuit to receive the first request signal, the second arbitration unit to grant ownership of the data path to the second hub agent when the second request signal is asserted if the first request signal is not asserted.

6. The system of claim 5, the first and second least recently serviced status tracking units to determine which of the first and second hub agents has been granted ownership of the data path least recently.

7. The system of claim 6, wherein if the first least recently serviced status tracking unit determines that the second hub agent has been granted ownership of the data path least recently the first arbitration unit asserts the first request signal and determines that the second request signal is not asserted before granting ownership of the data path to the first hub agent.

8. The system of claim 6, wherein if the first least recently serviced status tracking unit determines that the second hub agent has been granted ownership of the data path least recently the first arbitration unit asserts the first request signal and does not grant ownership of the data path to the first hub agent if the second request signal is asserted.

9. The system of claim 6, wherein if the first least recently serviced status tracking unit determines that the second hub agent has been granted ownership of the data path least recently and the first and second request signals are asserted, the first arbitration unit does not grant ownership of the data path to the first hub agent.

10. The system of claim 9 wherein the first least recently serviced status tracking unit comprehends that the second hub agent has been granted ownership of the data path.

11. A method, comprising:

outputting a first request signal from a first hub agent;

receiving a second request signal at the first hub agent, the second request signal transmitted from a second hub agent;

granting ownership of a data path to the first hub agent when the first request signal is asserted if the second request signal is not asserted; and determining which of the first hub agent and the second hub agent has been granted ownership of the data path least recently.

12. The method of claim 11, further comprising:

determining whether the second hub agent has been granted ownership of the data path least recently;

asserting the first request signal;

determining that the second request signal is not asserted; and granting ownership of the data path to the first hub agent if the second request signal is not asserted.

13. The method of claim 11, further comprising:

determining which of the first and second hub agents has been granted ownership of the data path least recently;

asserting the first request signal;

determining whether the second request signal is asserted; and granting ownership of the data path to the first hub agent if the second request signal is asserted and the first hub agent was granted ownership of the data path least recently.

* * * * *